(12) United States Patent
Isoda

(10) Patent No.: US 9,143,652 B2
(45) Date of Patent: Sep. 22, 2015

(54) IMAGE READING APPARATUS AND CONTROL METHOD THEREFOR

(71) Applicant: CANON KABUSHIKI KAISHA, Tokyo (JP)

(72) Inventor: Takashi Isoda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 129 days.

(21) Appl. No.: 13/765,554

(22) Filed: Feb. 12, 2013

(65) Prior Publication Data

US 2013/0208324 A1     Aug. 15, 2013

(30) Foreign Application Priority Data

Feb. 15, 2012   (JP) .................................. 2012-030814

(51) Int. Cl.
  *H04N 1/387* (2006.01)
  *H04N 1/00* (2006.01)
  *H04N 1/333* (2006.01)

(52) U.S. Cl.
  CPC ............... *H04N 1/387* (2013.01); *H04N 1/00* (2013.01); *H04N 1/33323* (2013.01); *H04N 2201/0081* (2013.01); *H04N 2201/33378* (2013.01)

(58) Field of Classification Search
  None
  See application file for complete search history.

(56) References Cited

U.S. PATENT DOCUMENTS 8,290,962 B1 * 10/2012 Chu ............................... 707/749
8,412,692 B2 * 4/2013 Lee ............................... 707/705
2007/0013972 A1 * 1/2007 Sheng ........................... 358/474

FOREIGN PATENT DOCUMENTS

JP     2008-306294 A    12/2008

* cited by examiner

*Primary Examiner* — Vincent Rudolph
*Assistant Examiner* — Michael Burleson
(74) *Attorney, Agent, or Firm* — Canon U.S.A. Inc., IP Division

(57) ABSTRACT

An image reading apparatus includes a reading unit configured to read an original document to generate image data, a first file generation unit configured to generate a first file based on first image data that is generated by reading a first original document using the reading unit, a second file generation unit configured to generate a second file based on second image data that is generated by reading a second original document using the reading unit, and an attaching unit configured to attach the second file to the first file, wherein the reading unit reads the second original document after reading the first original document.

10 Claims, 9 Drawing Sheets

IMAGE READING APPARATUS AND CONTROL METHOD THEREFOR

BACKGROUND OF THE INVENTION

1. Field of the Invention

The present invention relates to an image reading apparatus configured to read an original document to produce electronic data and convert the electronic data into a file.

2. Description of the Related Art

Electronic data such as image data is converted into a file using a certain file format when saved. Among various file formats, file formats which allow one file to include another file in an attached form are known. Such file formats include, for example, Portable Document Format (PDF) and Microsoft® Office (registered trademark) application file formats. Such attachment is made by using a personal computer having installed therein applications compatible with the file formats described above. Attaching a certain file to another file allows users to combine a plurality of files into one file in the file operation to operate the file. Users are also allowed to implement the functions available for only an attached file on a file having the attached file. For example, the PDF encryption function can be implemented on a file to be attached to a PDF file.

The process for generating a file can be performed using not only a personal computer but also an image reading apparatus configured to optically read an original document. For example, as described in Japanese Patent Laid-Open No. 2008-306294, an image processing apparatus that attaches a file generated by reading an original document to an electronic mail when transmitting the electronic mail is known.

In the related art, the operation of attaching a file to another file is performed using a personal computer. However, an image reading apparatus that generates a file by reading an original document image does not generally attach another file generated by reading another original document by itself to the generated file. Furthermore, no consideration is given as to what processing procedure to use to efficiently generate a file.

The present invention provides an image reading apparatus configured to efficiently perform a process of generating a file by reading an image on an original document and attaching a file generated by reading another original document to the generated file.

SUMMARY OF THE INVENTION

In an aspect, the present invention provides an image reading apparatus including a reading unit configured to read an original document to generate image data, a first file generation unit configured to generate a first file based on first image data that is generated by reading a first original document using the reading unit, a second file generation unit configured to generate a second file based on second image data that is generated by reading a second original document using the reading unit, and an attaching unit configured to attach the second file to the first file, wherein the reading unit reads the second original document after reading the first original document.

Further features of the present invention will become apparent from the following description of exemplary embodiments with reference to the attached drawings.

DESCRIPTION OF THE EMBODIMENTS

An embodiment of the present invention will be described in detail hereinafter with reference to the drawings. The following embodiment is not intended to limit the present invention defined in the attached claims, and all the combinations of features described in this embodiment are not essential to the present invention.

Figure 1:
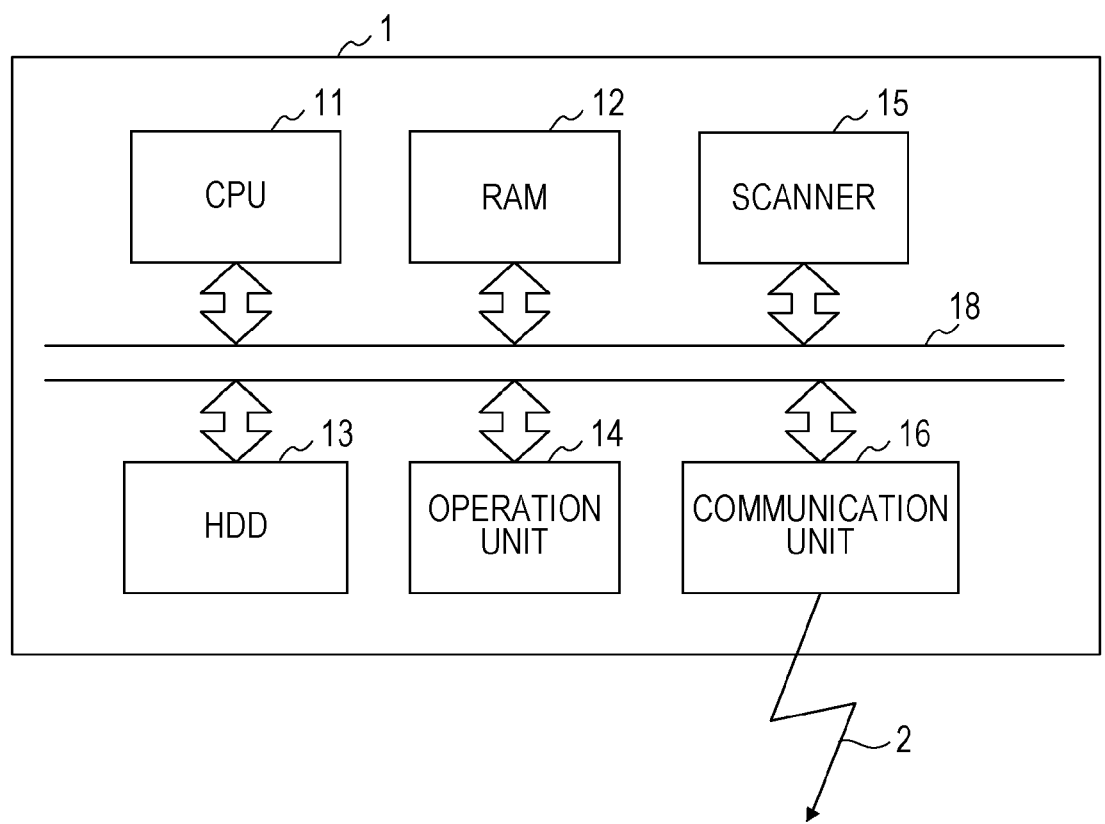
FIG. 1 is a diagram illustrating an example hardware configuration of an image processing apparatus according to an embodiment.

FIG. 1 is a diagram illustrating an example hardware configuration of an image processing apparatus 1 which is an example of an image reading apparatus according to an embodiment of the present invention. The image processing apparatus 1 is connectable other devices via a network 2. A central processing unit (CPU) 11 controls the operation of the image processing apparatus 1 in accordance with a program installed into a hard disk drive (HDD) 13 and expanded in a random access memory (RAM) 12. The RAM 12 provides a work area of the CPU 11 and temporarily stores various data. The HDD 13 stores programs, various settings, files, and so forth. A solid-state drive (SSD) may be used instead of the HDD 13. An operation unit 14 includes a liquid crystal display with a touch panel, and hard keys, and so forth, and is used by a user to perform various settings via a graphic user interface (GUI). A scanner 15 optically reads a document such as an original document and generates electronic data. A communication unit 16 controls communication with an external device via the network 2. The components described above are connected to one another via a main bus 18 to transmit data and control signals.

In the image processing apparatus 1 according to this embodiment, the CPU 11 controls the RAM 12, the HDD 13, the operation unit 14, the scanner 15, and the communication unit 16 via the main bus 18 to implement various types of control unless otherwise stated.

The CPU 11 of the image processing apparatus 1 has a function for generating a file having a predetermined format on the basis of image data of an original document read by the scanner 15. Examples of a file having a predetermined format include a Joint Photographic Experts Group (JPEG) file, a Tagged Image File Format (TIFF) file, a PDF file, and an Office Open Extensible Markup Language (OOXML). The communication unit 16 transmits the generated file to an external device (not illustrated) via the network 2.

In addition to the function for generating a file based on an original document read by the scanner 15, the image processing apparatus 1 according to this embodiment further has a function for attaching a file generated based on another original document read by the scanner 15 to the generated file. Thus, the image processing apparatus 1 can generate a file having another file attached thereto.

The image processing apparatus 1 illustrated in FIG. 1 may also be configured such that a printing device (not illustrated) is connected to the main bus 18. In this configuration, the image processing apparatus 1 serves as a multi-function peripheral (MFP) having a plurality of functions such as scanning and printing.

Figure 2:
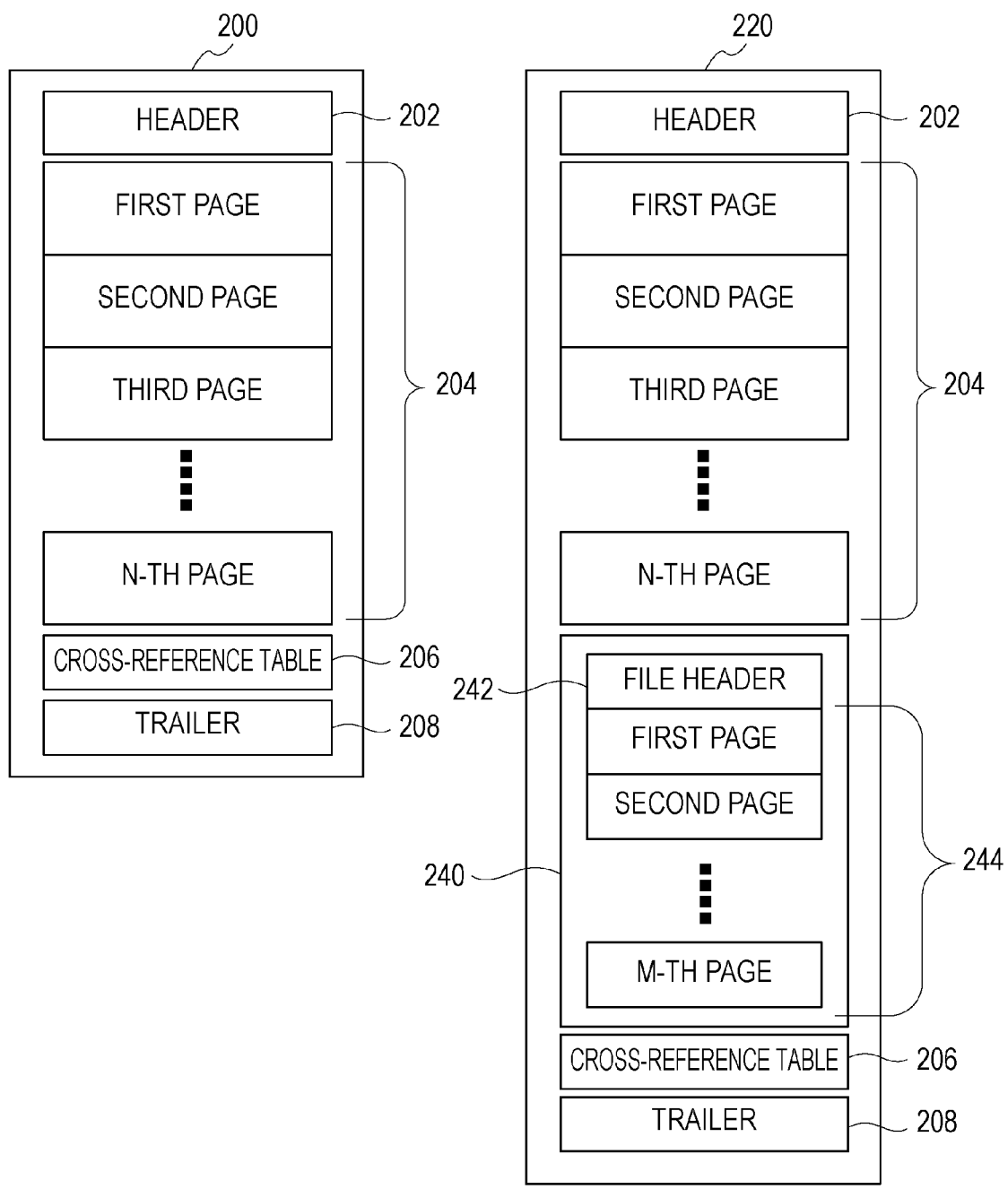
FIG. 2 is a diagram illustrating an example of the structure of a file to which another file can be attached.

FIG. 2 is a diagram illustrating an example of the structure of a file to which another file can be attached according to this embodiment.

A file 200 is electronic data in a predetermined file format including images of N pages. For example, the file 200 may be a PDF file.

The file 200 includes a header 202, a body 204, a cross-reference table 206, and a trailer 208. The header 202 includes information indicating a file type (for example, a PDF file), version information, and so forth. The body 204 includes information to be displayed or printed. In the example illustrated in FIG. 2, the body 204 includes image data of the N pages. The cross-reference table 206 includes information such as an address for accessing the information contained in the body 204. The trailer 208 is information indicating the end of the file.

A different file 240 is attached to the file 200 to generate a file 220. The file 220 includes the file 240 in addition to the configuration included in the file 200. In the example illustrated in FIG. 2, the file 240 is a file (for example, a TIFF file) including M pages, but may be a file in any other format. Further, the file 240 is not limited to a file representing an image, and may be a file such as a document file, a video file, an audio file, a text file, or a program file. In the example illustrated in FIG. 2, furthermore, the file 240 is placed, but not limited to, after the last page (i.e., the N-th page) in the body 204. The file 240 may be placed between desired pages in the body 204 (for example, between the second and third pages). The file 240 includes a file header 242 and a body 244 including M pages. In the following, a file including another file, such as the file 220, is referred to as an "attachment-including file", and a file included in another file, such as the file 240, is referred to as an "attached file".

Figure 3:
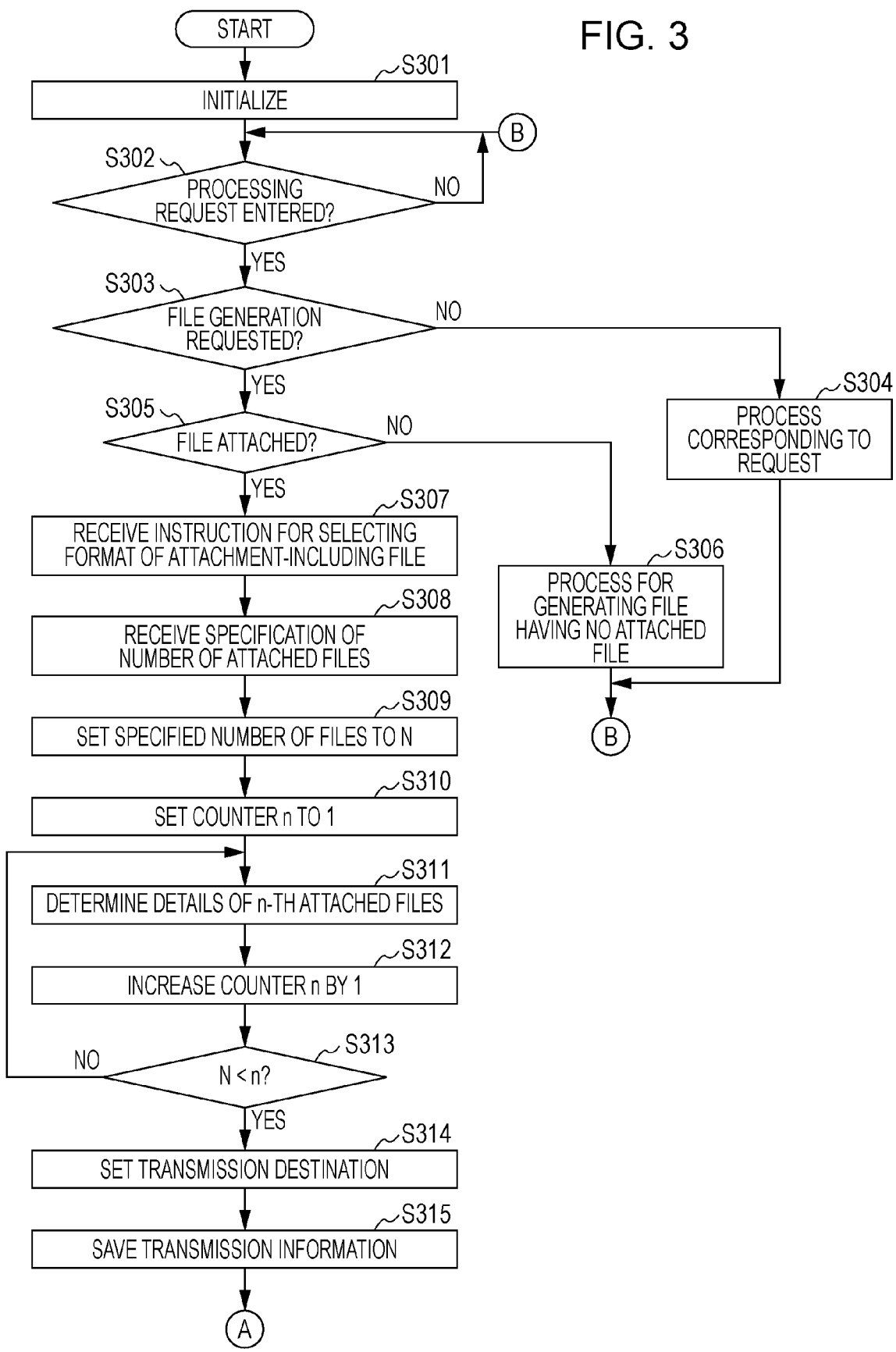
FIG. 3 is a flowchart illustrating an example of the operation of the image processing apparatus according to the embodiment.
Figure 4:
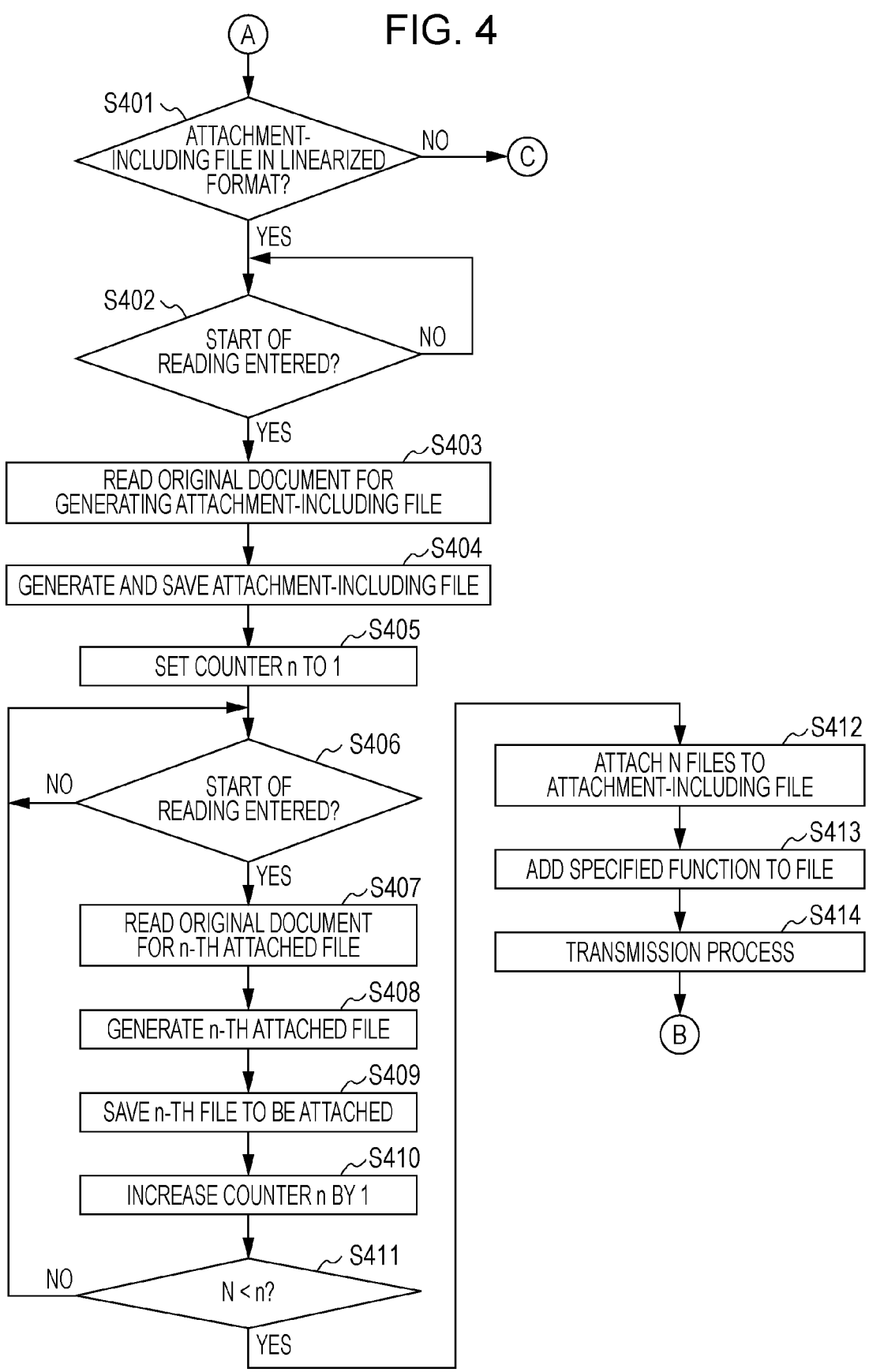
FIG. 4 is a flowchart illustrating the example of the operation of the image processing apparatus according to the embodiment.
Figure 5:
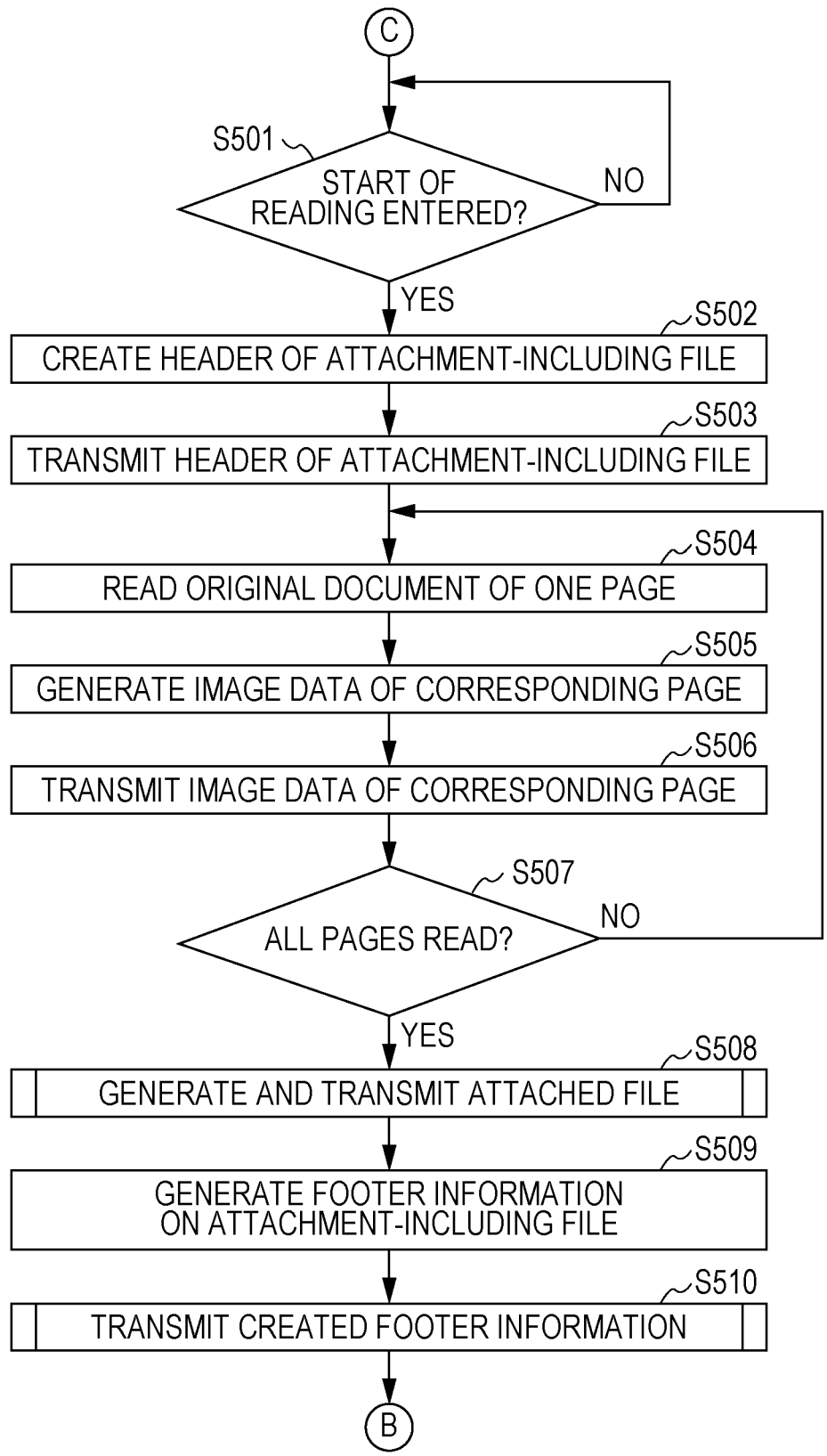
FIG. 5 is a flowchart illustrating the example of the operation of the image processing apparatus according to the embodiment.

FIGS. 3 to 5 illustrate a flowchart depicting an example of the operation of the image processing apparatus 1 according to this embodiment. A process illustrated in the flowchart is executed by the CPU 11 of the image processing apparatus 1. When power is supplied to the image processing apparatus 1, the process illustrated in the flowchart starts. In step (hereinafter abbreviated as S) 301, the image processing apparatus 1 is initialized. Then, in S302, the process waits for an incoming processing request from a user through the operation unit 14.

When a processing request is entered (Yes in S302), the process proceeds to S303. In S303, it is determined whether or not the processing request is a request for the generation of an electronic file by reading an original document. If the entered processing request is not a request for the generation of an electronic file by reading an original document (NO in S303), the process proceeds to S304, in which the process corresponding to the entered processing request is executed. Then, the process returns to S302.

If the entered processing request is a request for the generation of an electronic file by reading an original document (Yes in S303), the process proceeds to S305. In S305, an operation screen as illustrated in FIG. 6 is displayed on the operation unit 14, and the process waits for an operation input to be given by the user.

Figure 6:
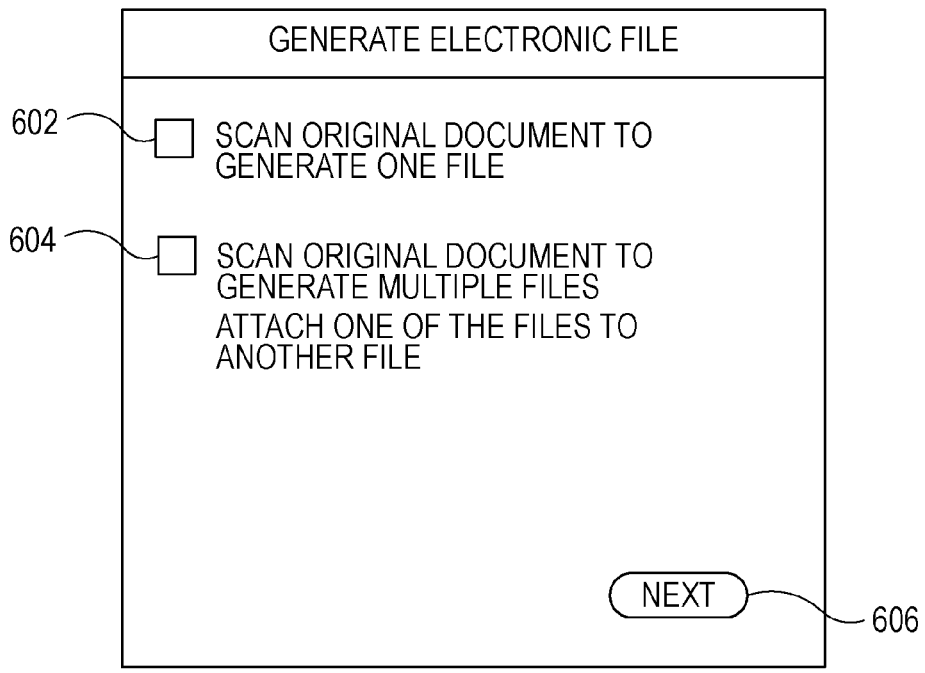
FIG. 6 is a diagram illustrating an example of an operation screen displayed on an operation unit of the image processing apparatus according to the embodiment.

When the user presses a button 602 and presses a button 606 on the operation screen illustrated in FIG. 6, the operation unit 14 receives an input of an instruction for "scanning an original document to generate one file". This instruction is specifically an instruction for generating a file such as the file 200 illustrated in FIG. 2. When an input of such an instruction is received, the process proceeds to S306.

When the user presses a button 604 and presses the button 606 on the operation screen illustrated in FIG. 6, the operation unit 14 receives an input of an instruction for "scanning an original document to generate multiple files and attaching one of the files to another file". The instruction is specifically an instruction for generating a file such as the file 220 illustrated in FIG. 2. When an input of such an instruction is received, the process proceeds to S307. In this embodiment, the buttons 602 and 604 are alternatively selectable on the operation screen illustrated in FIG. 6.

In S306, a process for reading an original document using the scanner 15 and generating a file in a predetermined format, such as the file 200 illustrated in FIG. 2, is executed. Then, the process returns to step S302.

Figure 7:
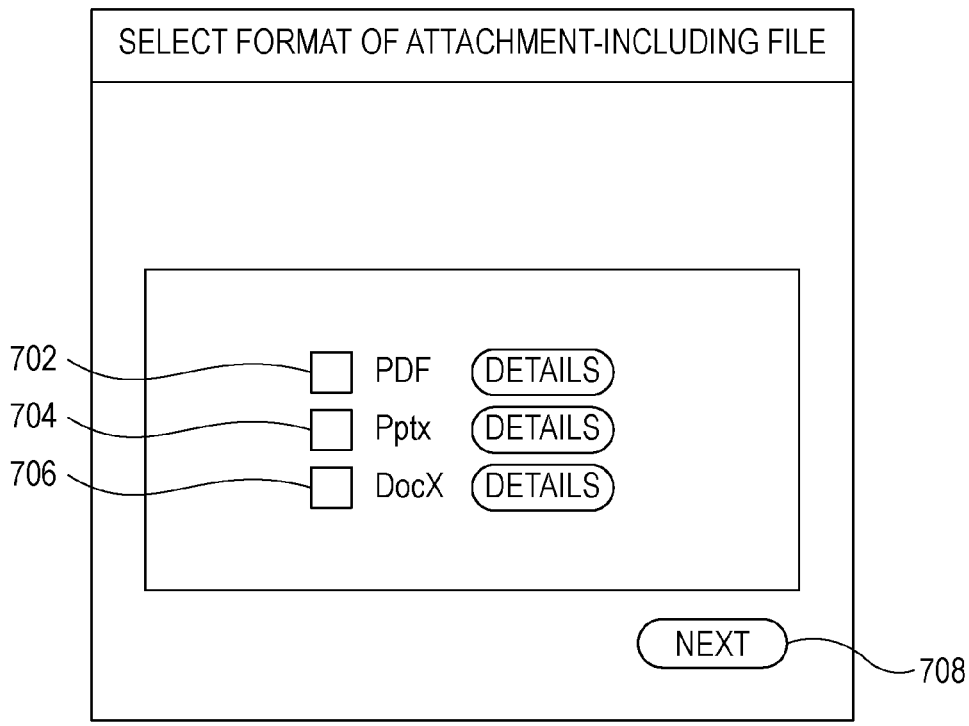
FIG. 7 is a diagram illustrating an example of an operation screen displayed on the operation unit of the image processing apparatus according to the embodiment.

In S307, in order to determine the format of a file (attachment-including file) to which another file is to be attached, an operation screen as illustrated in FIG. 7 is displayed on the operation unit 14, and the process waits for an instruction given from the user. In FIG. 7, the user can select a desired one of three formats. The file formats optionally displayed on the operation screen illustrated in FIG. 7 are file formats which allow a file to include another file attached among file formats that the image processing apparatus 1 can create. Buttons 702, 704, and 706 for allowing the user to select a format are alternatively selectable. Detail setting buttons corresponding to the respective formats are also placed on the operation screen illustrated in FIG. 7. The user may press one of the detail setting buttons to perform more detailed settings on the associated format.

Figure 8:
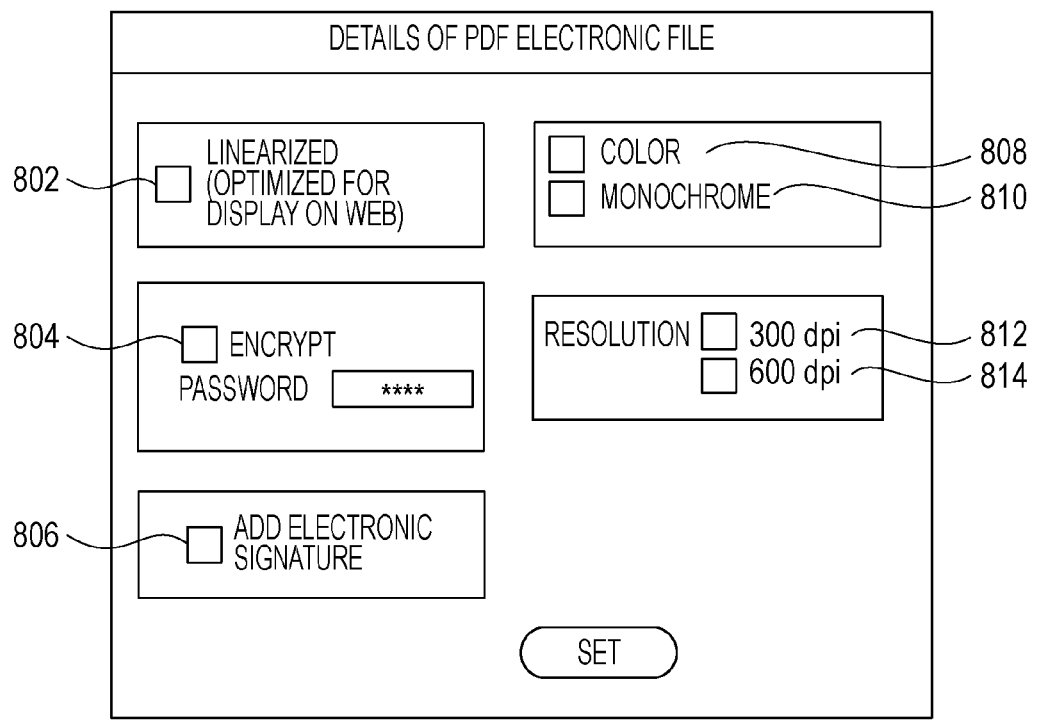
FIG. 8 is a diagram illustrating an example of an operation screen displayed on the operation unit of the image processing apparatus according to the embodiment.

FIG. 8 illustrates an example of an operation screen displayed on the operation unit 14 when the user presses the detail setting button associated with the PDF format selected with the button 702 illustrated in FIG. 7. The operation screen illustrated in FIG. 8 allows the user to perform various settings on a PDF file to be generated. A button 802 is a button used to generate a PDF file optimized for display on the web, that is, a linearized PDF file. A button 804 is a button used to generate an encrypted PDF file. A button 806 is a button used to generate a PDF file with an electronic signature. A button 808 is a button used to read an original document as a full-color image. A button 810 is a button used to read an original document as a monochrome, or black-and-white, image. Buttons 812 and 814 are buttons used to select a resolution at which an original document is to be read. When a "set" button is pressed on the operation screen illustrated in FIG. 8, the settings are determined, and the screen illustrated in FIG. 7 is displayed again. The user presses a button 708 after selecting a format, thereby determining the selected format.

Figure 9:
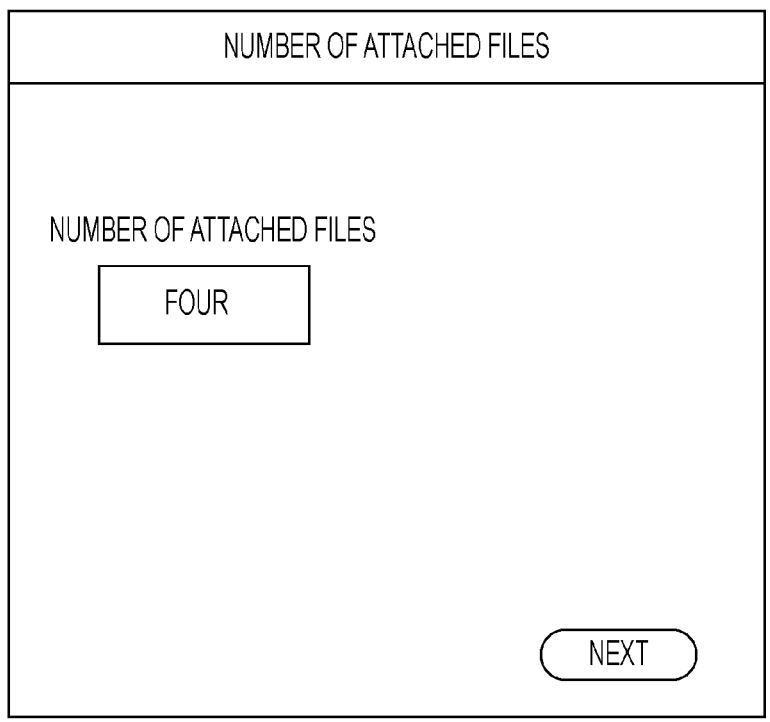
FIG. 9 is a diagram illustrating an example of an operation screen displayed on the operation unit of the image processing apparatus according to the embodiment.

Referring back to the flowchart in FIG. 3, in S307, an instruction on the format of the attachment-including file is received, and then the process proceeds to S308. In S308, an operation screen as illustrated in FIG. 9 is displayed on the operation unit 14, and the number of files to be attached to the attachment-including file, that is, the number of attached files, is specified. Then, the process proceeds to S309, in which the specified number of attached files, N, is stored in a predetermined storage area in the RAM 12 to set the value N. Then, in S310, the value n of a counter provided in the RAM 12 is set to 1.

Figures 10, 11:
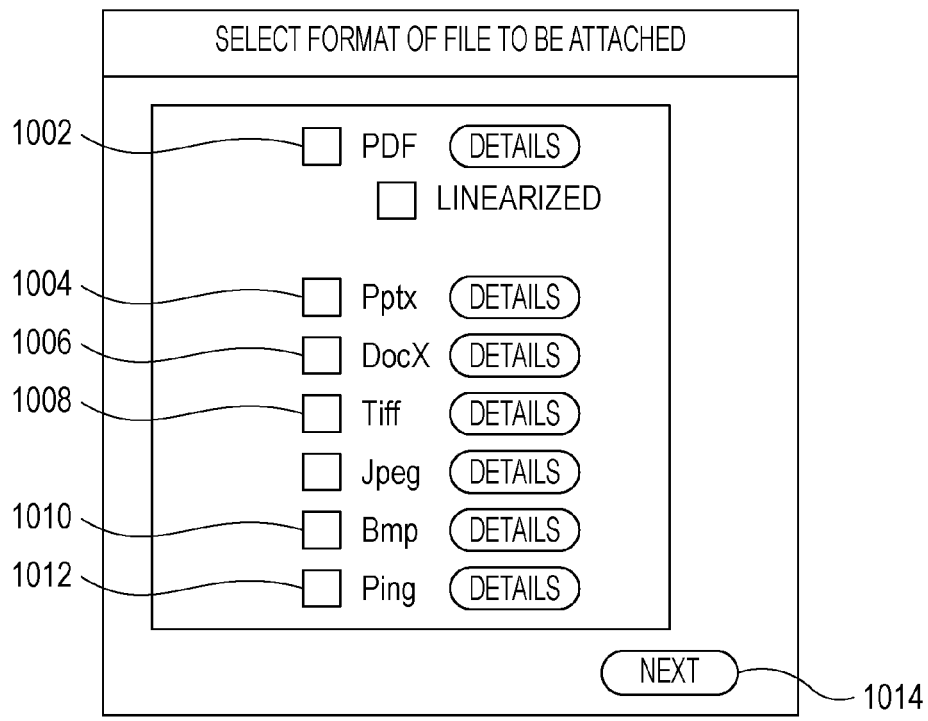
FIG. 10 is a diagram illustrating an example of an operation screen displayed on the operation unit of the image processing apparatus according to the embodiment.
FIG. 11 is a diagram illustrating an example of an operation screen displayed on the operation unit of the image processing apparatus according to the embodiment.

In S311, an operation screen as illustrated in FIG. 10 is displayed on the operation unit 14, and the format of the first attached file is specified. The operation screen illustrated in FIG. 10 has buttons 1002 to 1012 corresponding to the types of formats that the image processing apparatus 1 can create. The user selects one of the buttons 1002 to 1012 and presses a button 1014, thereby setting the format of the first attached file. The operation screen illustrated in FIG. 10 further has detail setting buttons associated with the respective formats. The user presses one of them to perform more detailed settings on the associated format. A button for specifying a linearized PDF file is further placed near the button 1002 for selecting a PDF file.

The processing of S311 is repeatedly performed a number of times equal to the number of attached files (N) (S312, S313), and thus the setting of the individual file formats of the N attached files is completed. Then, the process proceeds to S314.

In S314, a destination table screen as illustrated in FIG. 11 is displayed on the operation unit 14. The user selects a desired destination to set the destination to which a file is to be transmitted. The image processing apparatus 1 according to this embodiment is configured to transmit a file using a transmission method such as electronic mail, File Transfer Protocol (FTP), Server Message Block (SMB), or Web Distributed Authoring and Versioning (WebDAV). Then, the process proceeds to S315, in which the settings received in S307 to S314 are saved in the RAM 12 as transmission information. Then, the process proceeds to S401 illustrated in FIG. 4.

Figure 12:
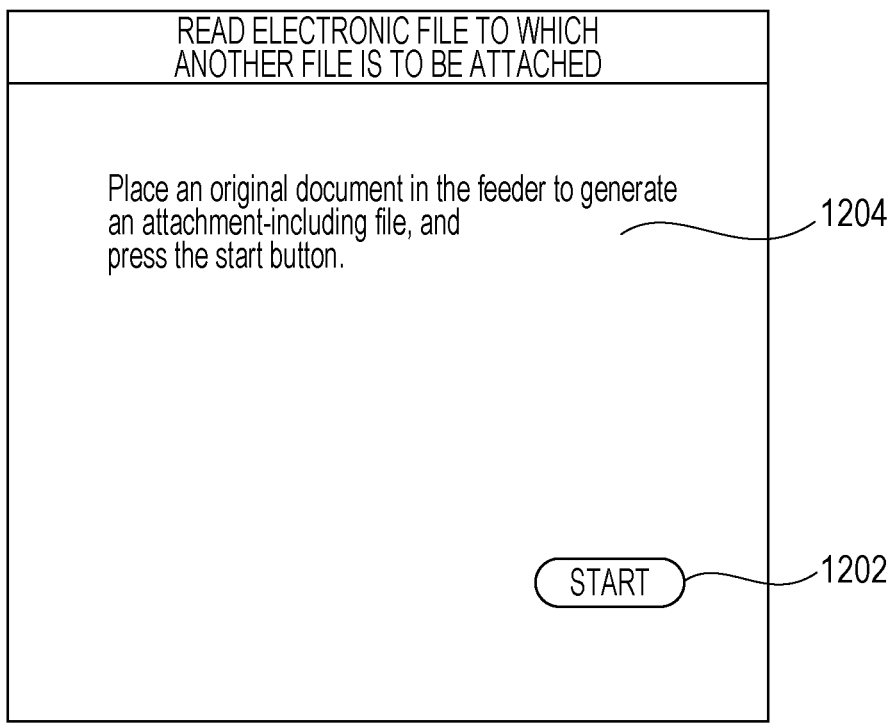
FIG. 12 is a diagram illustrating an example of an operation screen displayed on the operation unit of the image processing apparatus according to the embodiment.

The flowchart illustrated in FIG. 4 will now be described. In S401, it is determined whether or not the generation of a linearized PDF file as an attachment-including file has been specified on the operation screen illustrated in FIG. 8. If the generation of a linearized PDF file has been specified, an operation screen as illustrated in FIG. 12 is displayed on the operation unit 14, and then the process proceeds to S402. If the generation of a linearized PDF file has not been specified, the process proceeds to S501 (FIG. 5).

FIG. 12 illustrates an operation screen displayed on the operation unit 14 to allow the user to give an instruction to the scanner 15 to start reading an original document. To generate a file having another file attached thereto, first, an original document for generating information on pages (in the body 204 illustrated in FIG. 2) constituting an attachment-including file is read. To that end, a message 1204 is displayed on the operation screen illustrated in FIG. 12 to prompt the user to place an original document at a predetermined location to generate an attachment-including file. The user places an original document at the predetermined location and presses a button 1202, thereby giving an instruction to start reading the original document.

Referring back to the flowchart illustrated in FIG. 4, when the button 1202 is pressed and an instruction for starting reading an original document is received (YES in S402), the process proceeds to S403. In S403, the scanner 15 reads an original document to read an original document for an attachment-including file. Then, the process proceeds to S404, in which an attachment-including file is generated based on image data obtained by reading the original document, and the generated attachment-including file is stored in the HDD 13.

Figure 13:
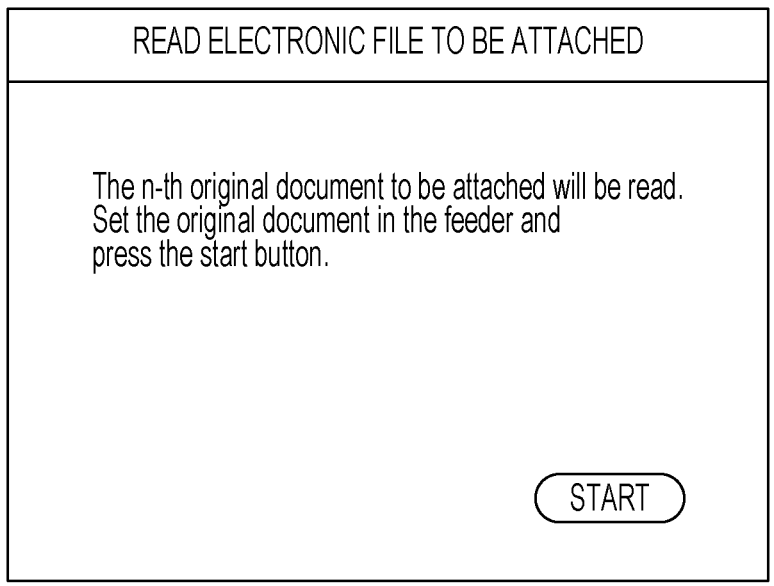
FIG. 13 is a diagram illustrating an example of an operation screen displayed on the operation unit of the image processing apparatus according to the embodiment.

Then, the process proceeds to S405, in which the value of the counter that counts the number of files to be attached is set to 1. Then, in S406, an operation screen as illustrated in FIG. 13 is displayed on the operation unit 14, and the process waits for the user to give an instruction to start reading an original document (or waits for the user to press a "start" button). When an original document reading start instruction given by the user is received (YES in S406), the process proceeds to S407, in which an original document for generating a file to be attached first is read. Then, the file to be attached first is generated (S408), and is saved in the HDD 13 (S409). Then, the counter is increased by 1 (S410). In this manner, the reading of original documents is repeatedly performed until the value of the counter has reached N (or until YES has been obtained in S411) (where the original documents to be read are replaced one after another by the user) to generate N attached files, and the generated N attached files are saved in the HDD 13. Then, the process proceeds to S412.

In S412, the generated N attached files are attached to the attachment-including file. Accordingly, an attachment-including file having files attached thereto is generated. The file generated in the manner described above is temporarily stored in a predetermined storage area in the HDD 13. Then, the process proceeds to S413, in which a process specified on the operation screen illustrated in FIG. 8, such as encryption with a password or addition of an electronic signature, is performed on the attachment-including file. Here, the linearized format has been specified. Thus, a process for optimizing the file structure illustrated in FIG. 2 is executed. To produce a linearized PDF file, a process for rearranging the internal structure of the file, that is, a process for changing the structure of the file, is performed. Such a process is not executable until the generation of a file has been completed through the processing up to S412. For this reason, the file generated in S412 is temporarily stored in the HDD 13 and then the process for producing a linearized PDF file is executed. The file obtained in the manner described above is transmitted to the transmission destination set in FIG. 11 (S414). Then, the process returns to S302 (FIG. 3).

If the generation of a linearized PDF file is not specified in S401 (FIG. 4), the process proceeds to S501 (FIG. 5).

The flowchart illustrated in FIG. 5 will now be described. First, the operation screen as illustrated in FIG. 12 is displayed on the operation unit 14, and then the process proceeds to S501. When the button 1202 is pressed and an original document reading start instruction is received (YES in S501), the process proceeds to S502. In S502, the header of the attachment-including file (header 202 illustrated in FIG. 2) is generated in accordance with the settings on the attachment-including file received from the user in S307 (FIG. 3). Then, the process proceeds to step S503, in which the header of the attachment-including file is transmitted to the transmission destination set in S314 (FIG. 3).

Then, the scanner 15 reads an original document of one page (S504), and generates image data for the corresponding page (S505). Then, the process proceeds to S506, in which the generated image data is transmitted to the same destination as the destination to which the header has been transmitted in S503. Then, it is determined in S507 whether or not original document images of all the pages have been read, and the processing of S504 to S506 is repeatedly performed until it is determined that original documents of all the pages have been read.

Then, the process proceeds to S508, in which an attached file is generated and the generated attached file is transmitted to the same destination as the transmission destination in S503 and S506. The generation of an attached file in S508 is performed in a manner similar to that in the processing of S405 to S411 in FIG. 4. When a plurality of attached files are to be generated, each time one attached file is generated, the generated attached file is transmitted to the destination.

Then, the process proceeds to S509, in which the footer of the attachment-including file (corresponding to the cross-reference table 206 and the trailer 208 illustrated in FIG. 2) is generated. Then, the generated footer is transmitted to the same destination as the transmission destination in S503, S506, and S508 (S510). In this manner, each time part (a header, image data for each page, an attached file, or a footer) of a file is generated, the generated part is transmitted to the transmission destination. The transmission of the respective parts is completed, and therefore a file is generated at the transmission destination. Then, the process returns to S302 (FIG. 3).

In S508, an attached file is generated in the image processing apparatus 1 and is then transmitted to the destination. Like an attachment-including file, also in an attached file, each time each of the file header (e.g., the file header 242 in FIG. 2) and image data for each page is generated, the generated element may be transmitted to the destination.

In S401 (FIG. 4), determination is based on only the format of an attachment-including file. In addition, determination may also be based on the transmission method of the file. If it is determined in S401 that the format of the attachment-including file is not the linearized format, the process branches to S501 (FIG. 5). However, if the transmission method of the file is electronic mail, the generated file needs to be attached to an electronic mail. Thus, the generated file needs to be temporarily saved in the HDD 13 of the image processing apparatus 1. Even though the format of the attachment-including file is not the linearized format, if the transmission method of the file is electronic mail, the process branches to S402. In contrast, if the format of the attachment-including file is not the linearized format and if the transmission method is SMB or FTP, the process branches to S501 (FIG. 5). The transmission method of the file is set together with the setting of the transmission destination in S314 (FIG. 3).

If the linearized format is not specified, there is no need to read all the original document images, convert the original document images into files, and store the files in the HDD 13. Therefore, it is possible to transmit each of the header, image data of an original document of each page, and the footer to the transmission destination immediately after generating each of them.

Further, an original document for an attachment-including file is read first and an original document for an attached file is read later, thus ensuring that the image data of the attachment-including file has been transmitted to the destination at the time when the attached file is generated (S508). Thus, there is no need to store both an attached file and image data having a relatively large data size (or image data of an attachment-including file) in the HDD 13. Therefore, it is possible to generate files even if the HDD 13 of the image processing apparatus 1 has a limited capacity.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-030814, filed Feb. 15, 2012, which is hereby incorporated by reference herein in its entirety.

What is claimed is:

1. An image reading apparatus comprising:
   a reading unit configured to read an original document to generate image data;
   a first file generation unit configured to generate a first file based on first image data, the first image data being generated by reading a first original document using the reading unit;
   a second file generation unit configured to generate a second file based on second image data, the second image data being generated by reading a second original document using the reading unit;
   an attaching unit configured to attach the second file to the first file, wherein the second file attached to the first file is contained in the first file while maintaining a file format in which the second file has been prior to being attached to the first file;
   a transmitting unit configured to transmit data to a specified transmission destination; and
   a specifying unit configured to specify whether or not to perform a process for changing a structure of the first file having the second file attached thereto,
   wherein the reading unit reads the second original document after reading the first original document, and
   wherein when the specifying unit does not specify that the process for changing the structure of the first file be performed, the transmitting unit transmits the first image data to the transmission destination before the reading unit reads the second original document.

2. The image reading apparatus according to claim 1, wherein the second file has a file format different from a file format of the first file.

3. The image reading apparatus according to claim 1, wherein when the specifying unit specifies that the process for changing the structure of the first file be performed, the transmitting unit transmits a file obtained by attaching the second file to the first file using the attaching unit to the transmission destination.

9

4. The image reading apparatus according to claim 1, wherein the first file is a Portable Document Format file.

5. The image reading apparatus according to claim 1, wherein the second file generation unit is configured to generate a plurality of second files, and
wherein when the second file generation unit generates a plurality of second files, the attaching unit attaches the plurality of second files to the first file.

6. A control method for an image reading apparatus including a reading unit configured to read an original document to generate image data, comprising:
generating a first file based on first image data, the first image data being generated by reading a first original document using the reading unit;
generating a second file based on second image data, the second image data being generated by reading a second original document using the reading unit;
attaching the second file to the first file, wherein the second file attached to the first file is contained in the first file while maintaining a file format in which the second file has been prior to being attached to the first file;
transmitting data to a specified transmission destination; and
specifying whether or not to perform a process for changing a structure of the first file having the second file attached hereto,
wherein the second original document is read after the first original document is read, and
wherein when it is not specified in the specifying step that the process for changing the structure of the first file be performed, transmitting the first image data to the transmission destination before the second original document is read.

7. A non-transitory computer-readable storage medium for causing an image reading apparatus to execute a control method, the image reading apparatus including a reading unit configured to read an original document to generate image data, the control method comprising:
generating a first file based on first image data, the first image data being generated by reading a first original document using the reading unit;
generating a second file based on second image data, the second image data being generated by reading a second original document using the reading unit;
attaching the second file to the first file, wherein the second file attached to the first file is contained in the first file while maintaining a file format in which the second file has been prior to being attached to the first file;
transmitting data to a specified transmission destination; and
specifying whether or not to perform a process for changing a structure of the first file having the second file attached hereto,
wherein the second original document is read after the first original document is read, and
wherein when it is not specified in the specifying step that the process for changing the structure of the first file be performed, transmitting the first image data to the transmission destination before the second original document is read.

8. An image reading apparatus comprising:
a reading unit configured to read an original document to generate image data;
a first file generation unit configured to generate a first file based on first image data, the first image data being generated by reading a first original document using the reading unit;

10 a second file generation unit configured to generate a second file based on second image data, the second image data being generated by reading a second original document using the reading unit; and
an attaching unit configured to attach the second file to the first file, wherein the attaching unit can attach, to the first file, the second file of which a type is different from a type of the first file;
a transmitting unit configured to transmit data to a specified transmission destination; and
a specifying unit configured to specify whether or not to perform a process for changing a structure of the first file having the second file attached thereto,
wherein the reading unit reads the second original document after reading the first original document, and
wherein when the specifying unit does not specify that the process for changing the structure of the first file be performed, the transmitting unit transmits the first image data to the transmission destination before the reading unit reads the second original document.

9. A control method for an image reading apparatus including a reading unit configured to read an original document to generate image data, comprising:
generating a first file based on first image data, the first image data being generated by reading a first original document using the reading unit;
generating a second file based on second image data, the second image data being generated by reading a second original document using the reading unit;
attaching the second file to the first file, wherein the attaching can attach, to the first file, the second file of which a type is different from a type of the first file;
transmitting data to a specified transmission destination; and
specifying whether or not to perform a process for changing a structure of the first file having the second file attached hereto,
wherein the second original document is read after the first original document is read, and
wherein when it is not specified in the specifying step that the process for changing the structure of the first file be performed, transmitting the first image data to the transmission destination before the second original document is read.

10. A non-transitory computer-readable storage medium for causing an image reading apparatus to execute a control method, the image reading apparatus including a reading unit configured to read an original document to generate image data, the control method comprising:
generating a first file based on first image data, the first image data being generated by reading a first original document using the reading unit;
generating a second file based on second image data, the second image data being generated by reading a second original document using the reading unit;
attaching the second file to the first file, wherein the attaching can attach, to the first file, the second file of which a type is different from a type of the first file;
transmitting data to a specified transmission destination; and
specifying whether or not to perform a process for changing a structure of the first file having the second file attached hereto,
wherein the second original document is read after the first original document is read, and
wherein when it is not specified in the specifying step that the process for changing the structure of the first file be performed, transmitting the first image data to the transmission destination before the second original document is read.

* * * * *